United States Patent [19]
Attig et al.

[11] Patent Number: 5,247,705
[45] Date of Patent: Sep. 21, 1993

[54] COMBINATION BROADCAST RECEIVER AND MOBILE TELEPHONE

[75] Inventors: Joachim Attig; Jürgen Kasser, both of Hildesheim; Helmut Liman, Klein Escherde; Matthias Scholz, Hildesheim, all of Fed. Rep. of Germany

[73] Assignee: Robert Bosch GmbH, Stuttgart, Fed. Rep. of Germany

[21] Appl. No.: 671,261

[22] Filed: Mar. 18, 1991

[30] Foreign Application Priority Data

Mar. 20, 1990 [DE] Fed. Rep. of Germany ....... 4008914
Mar. 28, 1990 [DE] Fed. Rep. of Germany ....... 4009900

[51] Int. Cl.⁵ .............................................. H04B 1/46
[52] U.S. Cl. ......................................... 455/74; 455/79; 455/345; 379/58; 381/42
[58] Field of Search .................... 455/74, 79, 116, 344, 455/345; 379/58, 59, 67; 381/42, 43

[56] References Cited

U.S. PATENT DOCUMENTS

| | | | |
|---|---|---|---|
| 4,378,603 | 3/1983 | Eastmond | 455/79 |
| 4,524,461 | 6/1985 | Kostanty et al. | 455/79 |
| 4,797,924 | 1/1989 | Schnars et al. | 381/43 |
| 4,827,520 | 5/1989 | Zeinstra | 381/43 |
| 4,945,570 | 7/1990 | Gerson et al. | 379/58 |
| 5,086,510 | 2/1992 | Guenther et al. | 455/345 |

FOREIGN PATENT DOCUMENTS

| | | |
|---|---|---|
| 0056587 | 7/1982 | European Pat. Off. . |
| 3236724 | 4/1983 | Fed. Rep. of Germany . |
| 2533513 | 3/1984 | France . |

OTHER PUBLICATIONS

JP Abstract M-46 11. Dez. 1980 vol. 4/No. 179.
JP Abstract vol. 8 No. 220 (M-330) (1657) Oct. 6, 1984.
Buschbeck, "Sprachausgabe im Kraftfahrzeug", [Speech Output in the Motor Vehicle], in German periodical *Der Elektroniker*, No. 5/1985, pp. 41–47.

*Primary Examiner*—Reinhard J. Eisenzopf
*Assistant Examiner*—Andrew Faile
*Attorney, Agent, or Firm*—Frishauf, Holtz, Goodman & Woodward

[57] ABSTRACT

A combination broadcast receiver and mobile telephone for motor vehicles is disclosed, in which acoustically operating devices are always switched off in the motor vehicle when a voice command detection circuit is switched on.

4 Claims, 1 Drawing Sheet

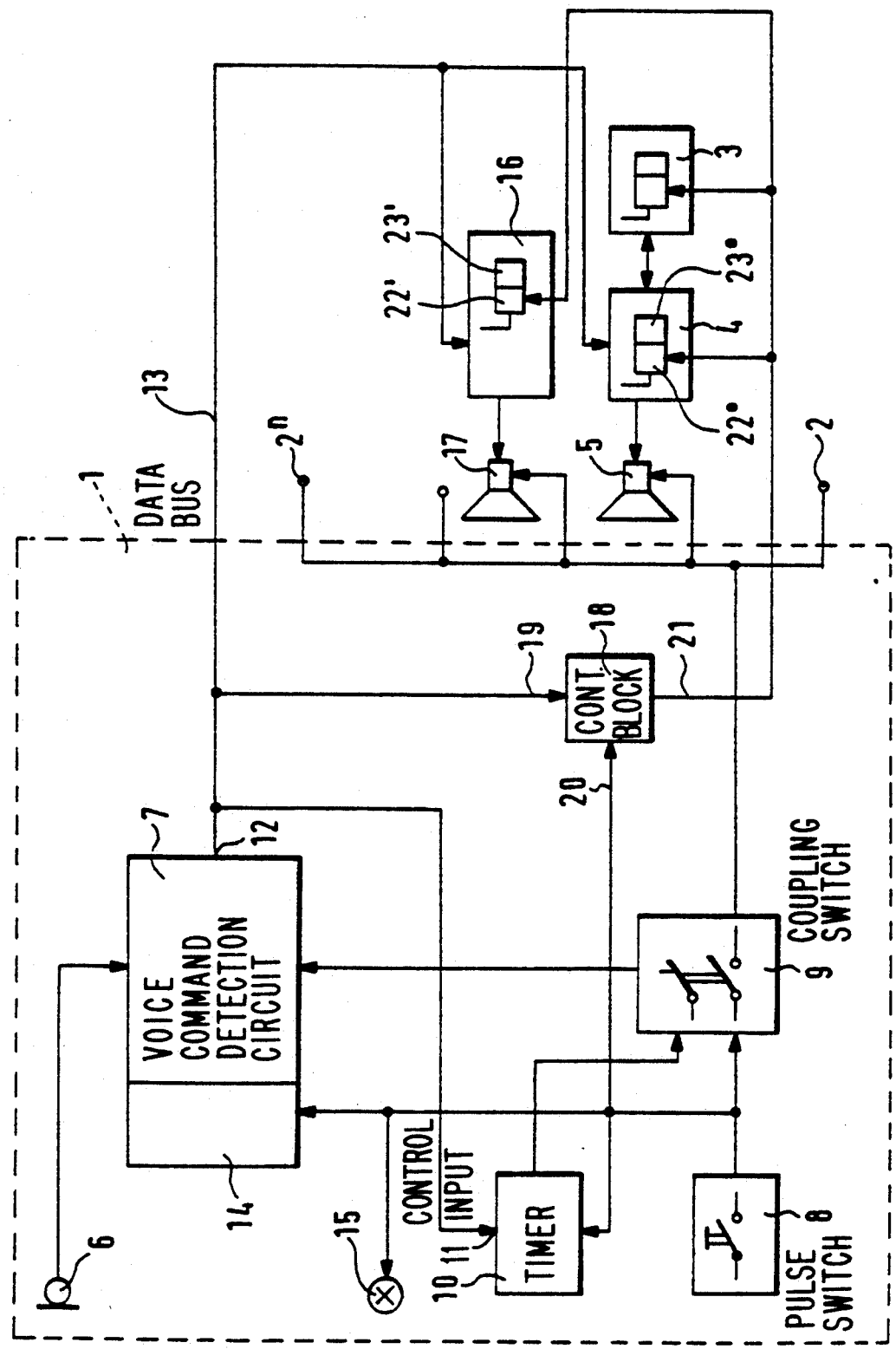

COMBINATION BROADCAST RECEIVER AND MOBILE TELEPHONE

FIELD OF THE INVENTION

The invention relates to a novel combination broadcast receiver and mobile telephone for motor vehicles with connections for one or a plurality of devices which become acoustically operative in the interior of the motor vehicle and where the combination comprises a microphone disposed in the interior of the motor vehicle and a voice command detection circuit.

BACKGROUND OF THE INVENTION

The control of auxiliary devices in motor vehicles by means of voice commands is known from the state of the art. The control elements of these devices comprise a microphone, disposed in the interior of the motor vehicle, and a voice command detection circuit. If, in addition to these devices, there are also car radios, radio transmitter and receiver devices for taxicabs or blowers located in the vehicle, which become acoustically operative in the interior, there is a danger that the voice commands issued by the driver are not recognized by the detection circuit or that the contents of conversations or radio broadcasts are mistaken for voice commands. There is the further danger that the transmission of a voice command which consists of a plurality of partial commands, such as the digits of a number, is broken off during a critical traffic situation and that the entire command must be repeated after the traffic situation is back to normal.

It has been suggested in a prior application to turn off or mute for a pre-determined period of time the devices which become acoustically operational in the vehicle interior, while the voice command is issued. This results in problems, if the command is intended to trigger the change in the setting of an acoustically operative device, for example setting the volume, because the volume continues to change until the voice command is recognized, even with the devices muted.

SUMMARY OF THE INVENTION

The object of the invention is the improvement of the combination broadcast receiver and mobile telephone disclosed in the prior patent so as to provide increased assurance of the execution of voice commands which result in a continuous change of the setting of controls.

This object is accomplished in the device of the present invention in that the gate circuits are disposed at the inputs of controls which can be adjusted by actuating pulses, which can be blocked by means of a control block, and in that the control block can be activated by means of a control command issued via the data bus supplied by the voice command detection circuit and blocks the gate circuits during the subsequent activation of the pulse switch.

BRIEF FIGURE DESCRIPTION

The single figure is a block diagram of the invention.

DETAILED DESCRIPTION OF THE PREFERRED EMBODIMENT

The combination broadcast receiver and mobile telephone 1 has connectors 2 ... $2^n$ for devices which become acoustically operative in the interior of the vehicle. These are, for example, a mobile telephone, which has a transmitter 3 with a hands-free voice input device and a receiver 4 with a loudspeaker 5. The combination 1 comprises a microphone 6 and a voice command detection circuit 7. Further components of the combination 1 are a pulse switch 8, which can be actuated by hand and is disposed at an easily accessible and comfortably located place in the motor vehicle, and a coupling switch 9 controlled by it; The voice command detection circuit 7 is switched on via the coupling switch 9 when the pulse switch 8 is first actuated, and the loudspeaker 5 of the mobile telephone as well as the parts of the other devices which generate sound waves are turned off.

Simultaneously a timer element 10 is activated by the pulse switch 8. At the end of the wait time, the timer element 10 returns the coupling switch 9 into its initial position and, thus switches off the voice command detection circuit 7 and switches on the loudspeaker 5 of the mobile telephone.

The timer element 10 has a control input 11, by means of which it is possible to set a wait time of the timer element 10 which is shorter or longer in respect to a set wait time. When set to a shorter wait time, the set wait time initiated by the pulse switch 8 is broken off; when set to a longer wait time, the running set wait time is also broken off, but a new set wait time is simultaneously initiated. The control input 11 of the timer element is connected to the output 12 of the voice command detection circuit 7, where an acknowledgement signal can be taken off.

When required, the operational commands for the mobile telephone are issued in voice form through the microphone 6. The voice signals received by the microphone are compared in the voice command detection circuit 7 with the sample commands stored in the voice command detection circuit 7. Once a command has been detected in the voice signals received, the voice command detection circuit issues an associated acknowledgement signal at the output 12.

Execution of the detected command in the connected devices is carried out over a data bus 13.

Depending on the type of the detected voice command, a shorter or longer wait time of the timer element after detection is set by the acknowledgement command, i.e. the wait time is either finally terminated or a further wait time is initiated in order to be ready for the evaluation of a further partial command.

If no voice command is detected in the set wait time, i.e if the timer element 10 does not receive an acknowledgement signal within a set wait time, the coupling switch 9 is reset at the end of the set wait time and thus the voice command detection circuit 7 is switched off and the loudspeaker 5 of the mobile telephone is switched on.

If the driver is required to pay increased attention to a critical traffic situation in the course of selecting a telephone number with several digits, he will as a rule break off the voice command, so that the timer element does not receive a further acknowledgement signal during its set wait time. In this case the already detected partial commands are stored in a memory 14 connected with the voice command detection circuit 7 and a blinking light 15 is switched on. Once the driver again actuates the pulse switch 8 following the resolution of the traffic situation, the information contents of the memory 14 are introduced into the program flow of the voice command detection circuit and the blinking light 15 is switched off.

The partial commands given to a car radio 16 connected to one of the outputs $2^n$ may consist, for example, of the alphanumeric data of the radio station, for example NDR3. The car radio is connected to the data bus 13 for executing the commands. However, the loudspeaker 17 of the car radio 16 is muted with the same signal as the loudspeaker 5 of the mobile telephone.

If the voice command triggers the adjustment of controls, for example the volume control, adjustment customarily is performed in steps. For this purpose actuating pulses are counted, as a rule, in a counter. The count then determines the setting of the control. If the device is now muted again for entering a stop command, the adjustment of the control will continue, unless further steps are taken, during the period of time required for detecting the stop command.

To prevent this disadvantage, a control block 18 is provided, the one input 19 of which is connected with the data bus 13 and the second input 20 of which is connected with the pulse switch 8. The output 21 of the control block 18 controls gate circuits 22 in the devices connected with the data bus 13, which are disposed at the input of the counters 23 for the control setting.

The control block 18 is laid out such that it is activated as soon as a set command for a control in one of the devices controlled by the data bus has been issued via the data bus 13.

Once the control setting desired in accordance with the set command has been reached, an appropriate stop command must be issued. For this purpose the pulse switch 8 must again be actuated and triggers the control sequence previously mentioned via the coupling switch 9.

However, the gate circuits 22 in the inputs of the counters 23 are already being blocked when the pulse switch 8 is actuated, so that during the detection time for the voice command no adjustment of the controls takes place.

Once the stop command has been detected, the adjustment of the controls is broken off in a known way. The control block 18 is deactivated at the same time.

Various changes and modifications are possible within the scope of the inventive concept.

What is claimed is:

1. A combination broadcast receiver and mobile telephone system for a motor vehicle having respective output terminals (2) controlling a plurality of peripheral devices (3, 4, 5, 17) which become acoustically operative in the interior of the motor vehicle, said system comprising
    a microphone (6) disposed in the interior of the motor vehicle and a voice command detection circuit (7) having a first input connected to said microphone (6);
    a manually actuatable pulse switch (8);
    a coupling switch (9) having a first input connected to an output of said pulse switch (8), and a plurality of outputs for simultaneously actuating the voice command detection circuit (7) and muting said peripheral devices (3, 4, 5, 17) connected to said terminals (2), and;
    a controllable timer element (10), which controls the length of time the coupling switch (9) is switched on, said timer element having a control input (11) which is connected to an output of the voice command detection circuit (7) for reception of an acknowledgement signal; wherein
    manual actuation of said pulse switch (8) turns on said coupling switch (9) for a predetermined initial muting period;
    said detection circuit (7) listens for a command during said initial muting period and, depending upon which command is detected, alternatively terminates said muting period or extends said muting period by sending said acknowledgement signal to said timer element (10).

2. A combination broadcast receiver and mobile telephone system for a motor vehicle having respective output terminals (2) controlling a plurality of peripheral devices (3, 4, 5, 17) which become acoustically operative in the interior of the motor vehicle, said system comprising:
    a microphone (6) disposed in the interior of the motor vehicle and a voice command detection circuit (7) having a first input connected to said microphone (6);
    a manually actuatable pulse switch (8);
    a coupling switch (9) having a first input connected to an output of said pulse switch (8), and a plurality of outputs for simultaneously actuating the voice command detection circuit (7) and muting said peripheral devices (3, 4, 5, 17) connected to said terminals (2) and;
    a controllable timer element (10), which controls the length of time the coupling switch (9) is switched on, said timer element having a control input (11) which is connected to an output of the voice command detection circuit (7) for reception of an acknowledgement signal, wherein:
    manual actuation of said pulse switch (8) turns on said coupling switch (9) for a predetermined initial muting period;
    said detection circuit (7) listens for a command during said initial muting period and, depending upon which command is detected, alternatively terminates said muting period or extends said muting period by sending said acknowledgement signal to said timer element (10);
    said detection circuit (7) includes a memory (14) and, if said detection circuit has not recognized a complete voice command prior to the end of said muting period, voice signals detected during said muting period are stored in said memory until said pulse switch (8) is again manually actuated.

3. A combination broadcast receiver and mobile telephone system for a motor vehicle in accordance with claim 2,
    wherein a visual indication device (15) is coupled to said pulse switch (8) and remains turned on while said voice signals are kept stored in said memory (14) of said voice command detection circuit (7).

4. A combination broadcast receiver and mobile telephone system in accordance with claim 2, further comprising:
    a data bus (13) interconnecting said detection circuit (7), said timer element (10), and said peripheral devices (3, 4, 5, 17);
    a control block (18) connected to said data bus (13);
    a respective control element (23) at each peripheral device;
    and a respective gate circuit (22) interposed between said data bus (13) and each control element (23);
    said control block (18) being operative, in response to a control signal from said detection circuit (7), to close said gate circuits and to thereby block adjustment of said control elements (23) of said peripheral devices during activation of the pulse switch (8).

* * * * *